Feb. 7, 1933. E. H. LICHTENBERG 1,896,906
AGGREGATES WEIGHING LOADING SKIP
Filed Dec. 12, 1928    2 Sheets-Sheet 1

Inventor
E. H. Lichtenberg
By Robert Robb
Attorneys

Feb. 7, 1933. E. H. LICHTENBERG 1,896,906
AGGREGATES WEIGHING LOADING SKIP
Filed Dec. 12, 1928 2 Sheets-Sheet 2

Inventor
E. H. Lichtenberg
By Robert Robb
Attorney

Patented Feb. 7, 1933

1,896,906

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

AGGREGATES WEIGHING LOADING SKIP

Application filed December 12, 1928. Serial No. 325,559.

In the laying of concrete roads today, the rules in the specifications concerning the quantities of concrete aggregates to be used, are becoming more and more rigid. Some specifications, both for concrete road work and for other concrete erections, call for the measurement of the aggregates by weight. Under these conditions, obviously, separate weighing operations are injected into the collecting of the aggregates preliminary to their being mixed in the customary types of concrete mixing machines, into which they are introduced usually as a batch.

The present invention has to do with the provision of a weighing means of novel type, and in describing the application of the invention, I refer to the common practice used today of measuring or weighing the aggregates of a batch, in a suitable way, and depositing the same from a batch collecting receptacle, or a motor vehicle, or the like, into what is known as a loading skip or bucket, forming a part of a concrete mixing machine. The loading skip or bucket is adapted to be hoisted by suitable hoisting mechanism operated by power from an engine, and elevates the collected concrete aggregates of the batch so that they may be readily discharged into the mouth or receiving opening or hopper of a concrete mixing drum.

Having in view the foregoing practice, the object of my invention has been to apply the concrete measuring or weighing device to the loading skip of the mixing machine, preferably beneath the bottom of said skip so as to in no way interfere with the introduction of the several aggregates thereinto. By locating the weighing device below the skip, the latter is permitted to rest upon said device and when the concrete aggregates are introduced separately, each particular aggregate may be weighed as it is placed in the skip, and great accuracy in measurement thus obtained in a very convenient and ready manner.

Of course within the purview of my invention, the weighing appliance may take many different forms. While I have shown the same as comprising a pressure member located under the skip to carry the weight of the skip and its contents, and thus indicate such weight visually, it is obvious that other embodiments of my invention might be employed wherein different kinds of pressure members might be mounted upon the skip in various ways and yet perform the desired function of measuring by accurate weight indicia forming a part of the suitable weighing scale.

I have illustrated in the accompanying drawings, two different embodiments of my invention, which are preferable, and an understanding thereof may be had from reference to the following description and to the said drawings, in the latter of which—

Figure 1:
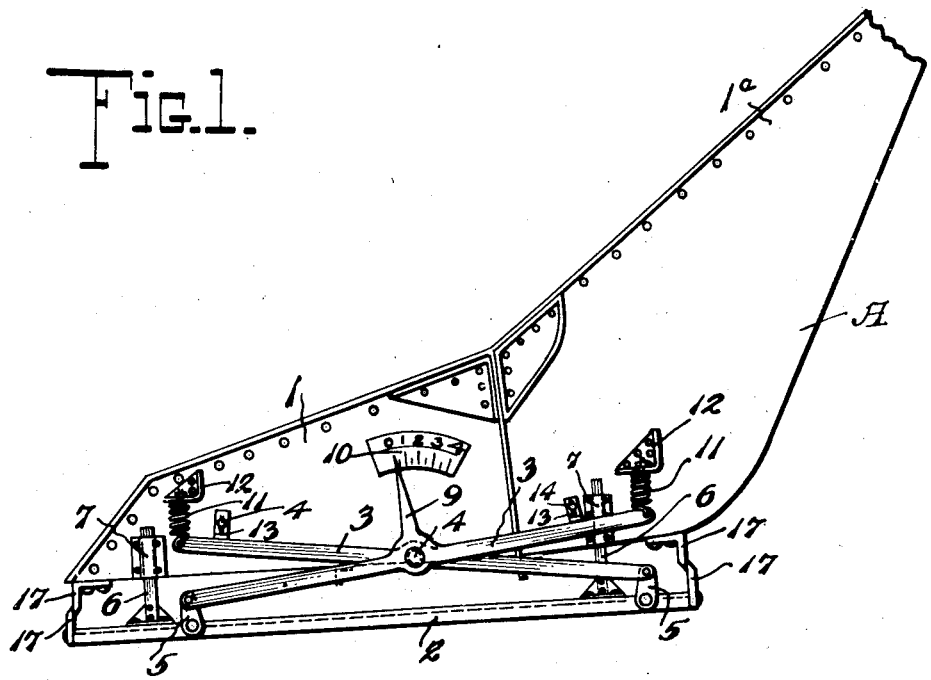
Figure 1 is a side elevation showing a preferred form of my invention.
Figure 4:
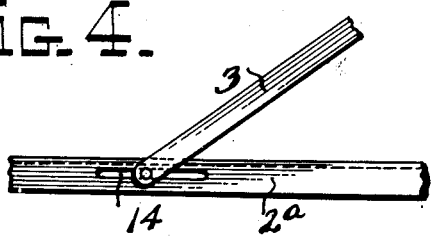
Figure 4 is a detailed view showing more clearly the sliding connection at one of the equalizing levers and the pressure member or platform.
Figure 2:
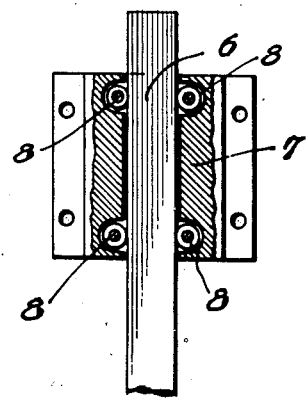
Figure 2 is a detailed view, partly in section showing more clearly the guide means for the pressure platform or false bottom provided beneath the loading skip.

Describing my invention specifically, it is unnecessary to refer, to any great extent, to the conventional type of mixing machines wherein there is employed the customary loading skip A, because this feature of such machines is well known to those versed in the art. The skip, practically speaking, comprises the aggregates receiving section 1 and the aggregates discharging section 1a.

My weighing attachment for this skip consists of a false base or platform 2 which I shall broadly characterize herein as a pressure member disposed in spaced relation to the skip and mounted underneath the same. This pressure member 2 performs a function somewhat equivalent to the function of a weighing platform of a plate scale, excepting that as applied in the present invention, the platform might be said to be upside-down.

The said pressure member 2 is carried by equalizing levers 3, a pair of which will be located at opposite sides of the skip, each pair having the common pivotal axis 4 which is secured to the skip. The levers are connected with the pressure member 2 by means of equalizing links 5. In order that the pressure member 2 may be guided in its movement and maintained in approximate parallelism with the bottom of the skip, I utilize guide standards 6 rigidly mounted on the pressure member 2 near the front and rear ends thereof, and guide mountings upon the body of the skip at the sides, the latter guide means or mountings being designated 7. I prefer to utilize suitable anti-friction bearings 8 intermediate the standards 6 and the bearings of the guide means 7 carried by the skip. One of the equalizing and supporting levers 3 is equipped with a pointer 9 adapted to cooperate with scale weighing indicia 10 on each side of the skip so that the persons adjacent the latter who are assisting in the operation of measuring the concrete aggregrates may readily see just how heavy the measured quantities of these aggregates are as they are introduced into the skip. The upper ends of the levers 3 have spring connections at 11 with suitable brackets 12 on the skip and these spring connections may be housed if desired. Also suitable stops 13 adjustably connected by fastenings 14, are mounted on the sides of the skips for abutment with the upper sides of the levers 3 to limit the upward movement of the levers and therefore limit movement of the pressure member 2 away from the skip proper.

Figure 3:
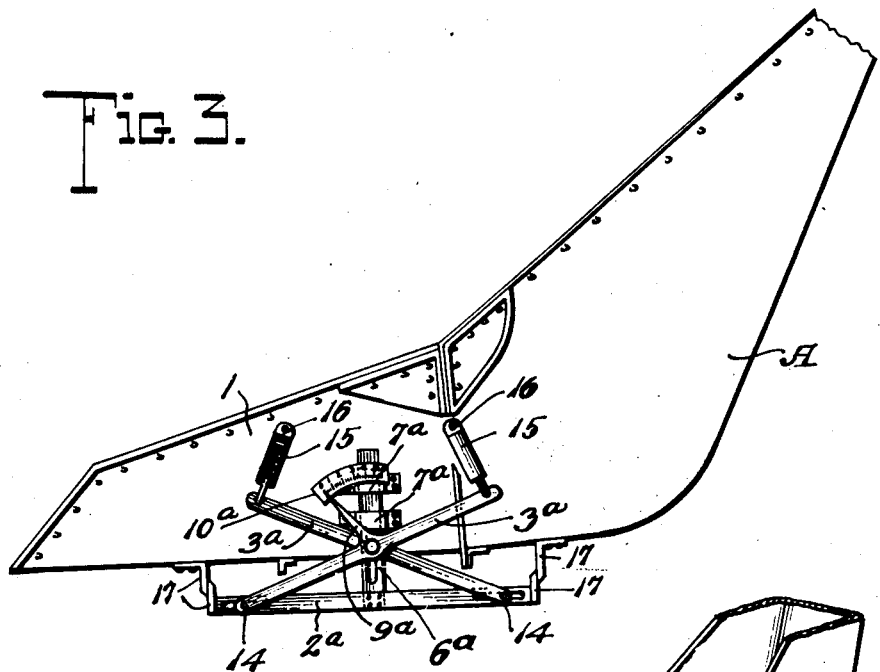
Figure 3 is a side elevation of a modified form of the invention.
Figure 5:
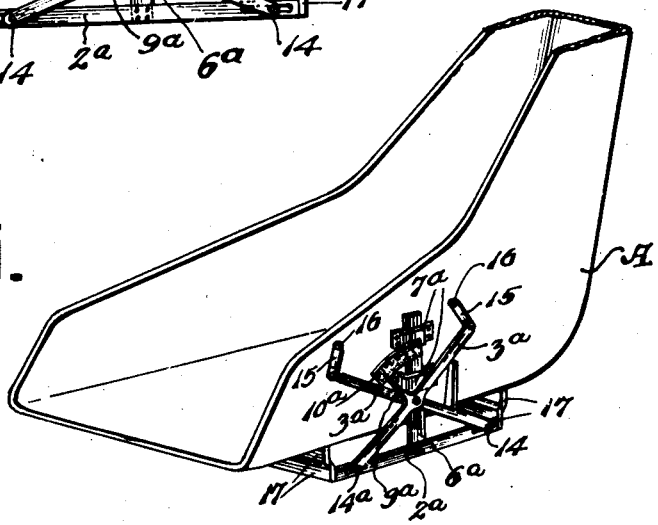
Figure 5 is a view in perspective of the construction shown in Figure 3, the skip being shown somewhat diagrammatically.

In Figure 3 I have illustrated a modified adaptation of the invention wherein I employ a central guiding standard 6a at each side of the pressure member 2a, and suitable guide means 7a on the skip for compelling the proper movement of the pressure member 2a as it receives pressure incident to the introduction into the skip of quantities of aggregates to be measured. To a certain extent, the lever system for attaching the pressure member 2a to the skip A in this construction, is much like the previous one. The equalizing or supporting levers 3a have pin and slot connections at their lower ends, designated 14, with the pressure member 2a. At their upper ends they are acted upon by suitable spring operated plungers mounted in suitable cylinders 15, pivotally carried by the skip at 16. A scale weighing indicia plate 10a is provided for the pointer 9a of this construction of my invention.

To prevent foreign matter from lodging between the pressure member 2 and the bottom of the skip, I provide suitable plates or flanges 17 on these parts, those of the pressure member 2 being at the front and rear edges, and those of the skip being at the front and rear portions also, and operated in a self-evident manner.

It will be clear from the foregoing that if a quantity of gravel is deposited in the skip A, it may be accurately measured by weight through the operation of the pointer 9 in conjunction with the weighing scale indicia at 10. A certain weight will be thus registered; then if a certain quantity of sand is dumped into the skip A, the weight will be registered by additional movement of the pointer 9, and this will be true when cement is deposited in the skip.

Or if a whole batch of cement, sand and gravel is deposited in the skip, they will be weighed all at one time in an accurate and convenient way.

It will be observed that the mounting of the pressure member 2 or 2a upon the skip A is such that no matter which portion of the member engages the ground or like surface, the amount of the pressure, which will of course be determined by the weight of deposited aggregates, will be properly registered on the weighing scale. This is due to the mounting of the platform member or pressure member 2 or 2a by equalizing levers upon the skip so that the pressure will be equalized at all times over the surface of the member 2 irrespective of where it is applied.

Having thus described my invention, what I claim as new and desire to secure by Letters Patent of the United States, is:—

1. In combination, a concrete mixing machine loading skip and a weighing device comprising a pressure member secured to the skip, the weighing device being arranged to engage the ground and to carry the skip when the skip is in charging position, the weighing device being operated incident to the depositing in the skip of aggregates to be weighed, and registering the weight of the said aggregates incident to engagement of the pressure member against the ground.

2. In combination, a concrete mixing machine loading skip and a weighing device comprising a pressure member secured to the skip and arranged to engage the ground and to carry the skip when the said skip is in charging position, the weighing device being operated incident to the depositing in the skip of aggregates to be weighed, the weighing device having a portion thereof beneath the skip, and means to register the weight of the aggregates incident to the engagement of the pressure member against the ground under a load of aggregates received in the skip.

3. In combination, a concrete mixing machine loading skip, and a weighing device secured to the skip and carrying the skip when the skip is in charging position, the weighing device being operated incident to the depositing in the skip of aggregates to be weighed, said weighing device comprising a pressure member, equalizing levers connecting the pressure member with the skip, means to resist the weight of the aggregates, and weighing scale indicating means cooperating to indicate the weight of aggregates deposited in the skip.

4. In combination, a mixing machine loading skip and weighing means for weighing aggregates deposited in the skip, the weighing means comprising a pressure member mounted wholly upon the skip and carried thereby while carrying the skip when the latter is in charging position, the pressure member being adapted to be moved relatively to the skip by the action of the skip upon receiving different quantities of aggregate material being charged therein, means for resisting such relative movement, and means for registering the extent of such relative movement.

5. In combination, a mixing machine loading skip, and weighing means for weighing aggregates deposited in the skip, the weighing means comprising a pressure member movably carrying the skip when the skip is in charging position, the pressure member being adapted to be moved relatively to the skip by the action of the skip receiving therein different quantities of aggregate materials, means for resisting such relative movement, and means for registering the extent of such relative movement, comprising pointers at opposite sides of the skip and weighing scale indicia applied to the skip to cooperate with the pointers.

6. In combination, a mixing machine loading skip and a weighing attachment therefor comprising a pressure member disposed beneath the skip, the pressure member being mounted wholly upon the skip and being carried thereby while carrying the skip when the latter is in charging position, together with means for registering the extent of movement of said pressure member under the influence of weight of aggregates deposited in the skip.

7. In combination, a mixing machine loading skip, and a weighing attachment therefor, comprising a pressure member disposed beneath the skip, together with means for registering the extent of relative movement of said pressure member and skip under the influence of weight of aggregates deposited in the skip, comprising equalizing levers attached to the skip near opposite sides of the skip, pointer means associated with said levers to indicate the extent of said relative movement, means for resisting such movement, and weighing scale indicia cooperating with said pointer means.

8. In combination, a mixing machine loading skip, and a weighing attachment therefor, comprising a pressure member disposed beneath the skip, together with means for registering the extent of relative movement of said pressure member and skip under the influence of weight of aggregates deposited in the skip, comprising equalizing levers attached to the skip near opposite sides of the skip, means for opposing such movement, pointer means associated with said levers to indicate the extent of said relative movement, and weighing scale indicia cooperating with said pointer means, the said equalizing levers being connected to the pressure member at spaced points and connected to the skip at spaced points, and a pair of said levers being provided near opposite sides of the skip and corresponding edges of the pressure member.

9. In combination, a concrete mixing machine loading skip, and a weighing device secured to the skip and carrying the skip when the skip is in charging position, the weighing device including a pressure member and equalizing connections between the pressure member and the skip whereby pressure applied at any point over the surface of the pressure member will be equalized thereon, means for opposing the pressure, and means for registering said pressure.

10. In combination, a concete mixing machine loading skip, and a weighing device secured to the skip and carrying the skip when the skip is in charging position and comprising a pressure member to receive pressure incident to the weight of materials received in the skip, said pressure member being adapted to engage with the ground surface or subgrade, means for distributing pressure at any point on the pressure member over its entire surface in an equalized manner, instrumentalities for opposing such pressure, and means for registering the amount of the pressure and thereby the amount of weight received in the skip creating said pressure.

In testimony whereof I affix my signature.

ERICH H. LICHTENBERG.